United States Patent [19]

Nishimura et al.

[11] Patent Number: 4,848,552
[45] Date of Patent: Jul. 18, 1989

[54] DAMPER DISC

[75] Inventors: Yoshio Nishimura, Neyagawa; Syogo Ohga, Osaka, both of Japan

[73] Assignee: Kabushiki Kaisha Daikin Seisakucho, Osaka, Japan

[21] Appl. No.: 110,055

[22] Filed: Oct. 15, 1987

Related U.S. Application Data

[63] Continuation of Ser. No. 836,369, Mar. 5, 1986, abandoned.

[30] Foreign Application Priority Data

Mar. 6, 1985 [JP] Japan ................................ 60-44300

[51] Int. Cl.$^4$ .............................................. F16D 3/14
[52] U.S. Cl. .............................. 192/106.2; 192/106.1
[58] Field of Search ............... 192/106.1, 106.2, 70.18

[56] References Cited

U.S. PATENT DOCUMENTS

| 4,533,031 | 8/1985 | Nagano | 192/106.1 X |
| 4,549,641 | 10/1985 | Ootani et al. | 192/106.2 |
| 4,574,932 | 3/1986 | Després | 192/106.2 X |
| 4,577,743 | 3/1986 | Raab et al. | 192/106.2 |
| 4,596,535 | 6/1986 | Ooga | 192/106.2 X |
| 4,618,048 | 10/1986 | Kabayashi | 192/106.2 |
| 4,620,626 | 11/1986 | Lech, Jr. et al. | 192/106.2 |

FOREIGN PATENT DOCUMENTS 2103758 2/1983 United Kingdom ............. 192/106.2

Primary Examiner—David A. Scherbel
Assistant Examiner—Creighton Smith
Attorney, Agent, or Firm—Armstrong, Nikaido, Marmelstein, Kubovcik & Murray

[57] ABSTRACT

A damper disc, in which first friction washers generating a large hysteresis torque are provided on both sides of a flange of a spline hub an approximately annular disc-like intermediate member is provided so as to be pressed on an outside of a friction washer, a projection projecting toward a side plate is formed the intermediate member, the projection being made fit in the side plate in such a manner that they can slide freely each other within a specified torsion angle, and a second friction washer generating a small hysteresis torque is provided between said intermediate member and the side plate.

3 Claims, 3 Drawing Sheets

FIG. 1
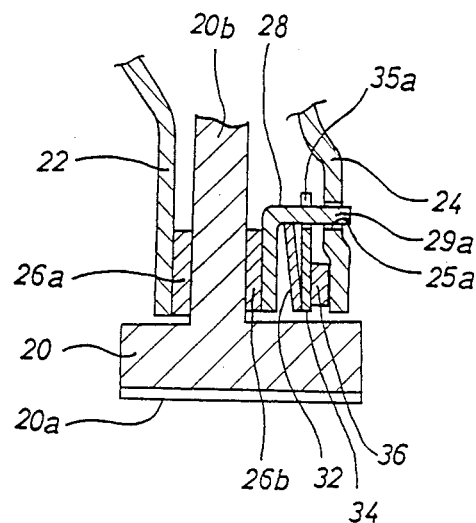
FIG. 3
FIG. 2
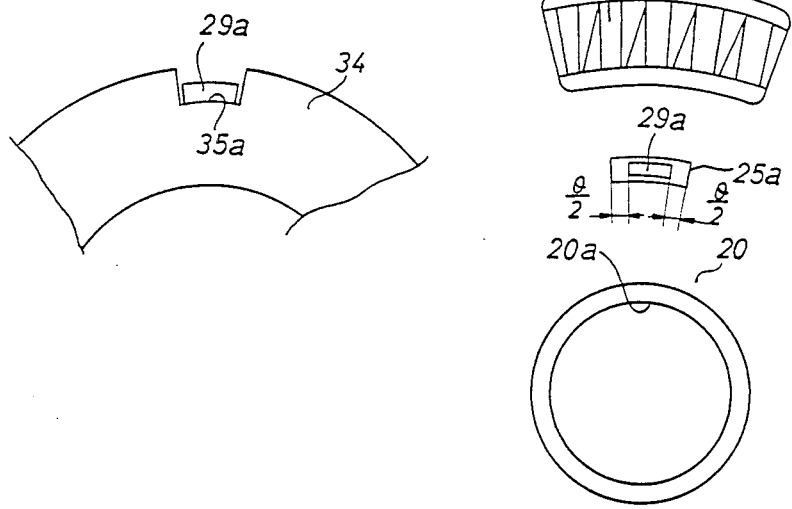

DAMPER DISC

This application is a continuation division of application Ser. No. 836,369 filed Mar. 5, 1986 now aband.

BACKGROUND OF THE INVENTION

1. Industrial useful field

This invention relates to an improvement in a damper disc which can increase or decrease a hysteresis torque generated in accordance with a change of torsion angle.

2. Prior art

Utility Model No. 55-12598 has conventionally been known as this type of clutch disc. In this conventional embodiment, two friction washers 12 are provided so as to hold a flange 10a of a spline hub 10 between them, friction plates 14 are pressed by a cone spring 15 on external sides of the friction washers 12 respectively, and projections 14a are formed on inner peripheral parts of the friction plates 14, as shown in FIG. 7. These projections 14a are made fit in two side plates 14 in such a manner that they can slide freely each other within a specified torsion angle, a small hysteresis torque is generated by the friction plates 14 within a small torsion angle at which the side plates 16 and the friction plates 14 are slidable each other, and a large torsion torque is generated by the friction plates 14 and the friction washers 12 when the torsion torque becomes large.

In the above-mentioned conventional embodiment, however, a large force would be applied on the projection 14a to lessen a strength of the projection 14a because the projection 14a is provided at the inner peripheral part. Further, since it is necessary to form a notch 16a for passing through the projection 14a on the side plate 16, a deviated wear on a contact surface between the friction plate 14 and the side plate 16 is apt to occur and a specified hysteresis torque can not be obtained if the above deviated wear occurs.

Further, in case of the construction as illustrated in FIG. 7, the small torsion angle can generate only a minimum hysteresis torque so that obtainable characteristics are confined. Therefore, in case when a comparatively large hysteresis torque of about 50% of the large torsion angle, for example, is required even in the small torsion angle range, the required hysteresis characteristics can not be obtained.

OBJECT OF THE INVENTION

A first object of the present invention is to dissolve the above-mentioned problem, and another object thereof is to make it possible to obtain a desired hysteresis characteristic by means of a difference of contact area of an intermediate member.

In order to accomplish said first object, in this invention (claim 1), first friction washers generating a large hysteresis torque are provided on both sides of a flange of a spline hub having a spline internal tooth, an approximately annular disc-like intermediate member is provided so as to be pressed on an outside of at least one of the both friction washers, a projection projecting toward a side plate is formed on a radially outer peripheral part of the intermediate member, the projection being made fit in the side plate in such a manner that they can slide freely each other within a specified torsion angle, and a second friction washer generating a small hysteresis torque is provided between said intermediate member and the side plate.

Further, in order to accomplish another object together with the first object, for obtaining a desired hysteresis characteristic by means of a difference of contact area of the intermediate member, in a second invention (claim 4), first friction washers generating a large hysteresis torque are provided on both sides of a flange of a spline hub having a spline internal tooth, an approximately annular disc-like intermediate member made of a friction material is provided so as to be pressed on an outside of at least one of the both friction washers, a projection projecting toward a side plate is formed on a radially outer peripheral part of the intermediate member, the projection being made fit in the side plate in such a manner that they can slide freely each other within a specified torsion angle, a first contact face having a large area is formed on a face at the first friction washer side of said intermediate member, and a second contact face having a small area is formed on a face at the side plate side of said intermediate member.

BRIEF DESCRIPTION OF THE DRAWINGS

FIG. 1 is a vertical sectional partial view showing a clutch disc of a first embodiment applied with a first invention.

FIG. 2 is a figure viewed in a direction of arrow II of FIG. 1.

FIG. 3 is a partial plan view of a sub-friction plate.

DETAILED DESCRIPTION OF THE INVENTION

EMBODIMENT 1

Figure 4:
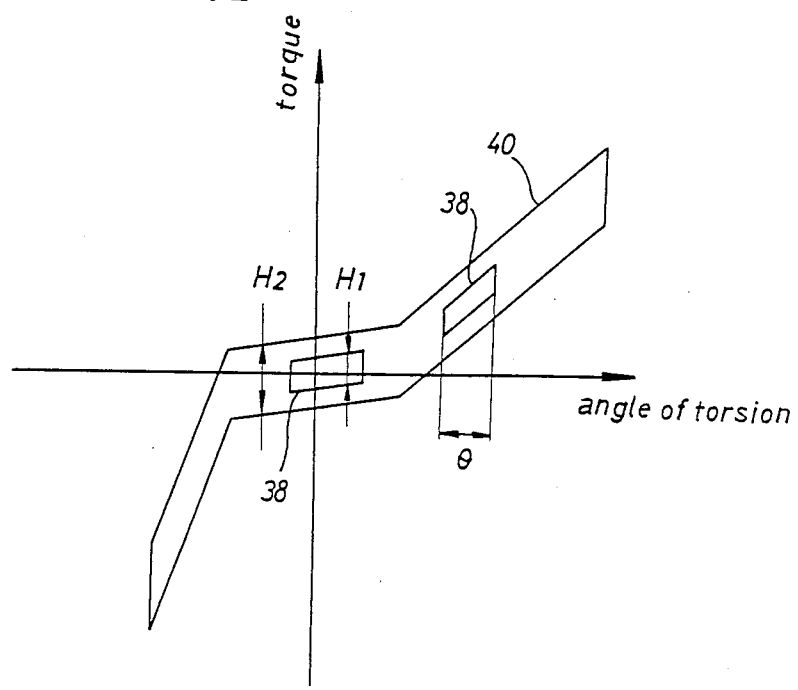
FIG. 4 is a graph slowing a hysteresis torque characteristic of the first embodiment.

In FIG. 1 showing a case wherein the first invention is applied to a clutch disc for automobile, 20 is a spline hub. A spline internal tooth 20a of the spline hub 20 spline fits onto an input shaft (not shown) of a speed changer. An approximately annular clutch plate 22 and a retaining plate 24 (both being side plates) are provided on both sides of a flange 20b of the spline hub 20 with a specified distance kept therebetween, and a facing (not shown) pressing on a flywheel (not shown) of an engine is fixed through a cushioning plate (not shown) to an outer peripheral part of the clutch plate 22. The clutch plate 22 and the retaining plate 24 are held to the flange 20b at their outer peripheral parts through torsion springs (not shown) in such a manner that they can slide freely each other within a specified torsion angle.

Annular first friction washers 26a & 26b press on both side faces of the flange 20b, and the first friction washers 26a & 26b have a comparatively large friction coefficient and are formed of such a material that exerts a large hysteresis torque of about 2 kg.m which is suitable for absorbing a torsion torque at the time of engaging & disengaging a clutch.

The clutch plate 22 presses on an external end face of the first friction washer 26a. A friction plate 28 (intermediate member) presses on an external end face of the first friction washer 26b. The friction plate 28 is formed into an approximately annular disc-like shape, and projections 29a bent toward the retaining plate 24 are formed on circumferential four places, for example, of an outer peripheral part of the friction plate 28 with equal spaced left therebetween.

The projections 29a fit in holes 25a of the retaining plate 24 as shown in FIG. 2 in such a manner that they can slide freely each other in their circumferential direction. When an allowable sliding angle is designated as $\theta$, clearances $\theta/2$ are provided on both sides of the projection 29a. Therefore, under a state wherein the projection 29a is pressed against either end of the hole 25a, the projection 29a can slide freely in the reverse direction within an angle of about 2°~3° for example. Incidentally, 30 is a torsion spring in FIG. 2.

As illustrated in FIG. 1, a cone spring 32, a subfriction plate 34 and a second friction washer 36 are interposed in this sequential order from inside between the friction plate 28 and the retaining plate 24. The cone spring 32 is adapted to press the sub-friction plate 34 and the second friction washer 36 against a side of the retaining plate 24 and presses the friction plate 28 and the first friction washer 26b against a side of the flange 20b.

The sub-friction plate 34 has a notch 35a at its outer peripheral edge as shown in FIG. 3, and is adapted to slide integrally with the friction plate 28 by fitting the projection 29a in the notch 35a.

The second friction washer 36 is formed of a material having a comparatively small friction coefficient, and is adapted to generate a small hysteresis torque of about 0.5 kg.m, for example, which is suitable for absorbing an engine torque fluctuation.

FUNCTION OF THE INVENTION

First, in case when a torsion having a small torsion angle of below the allowable sliding angle $\theta$ is generated by the engine torque fluctuation, the projection 29a of the friction plate 28 can slide freely in relation to the hole 25a of the retaining plate 24 each other, so that a torsion torque from the retaining plate 24 is not transmitted to the friction plate 28 and hysteresis torques are generated at between the retaining plate 24 and the second friction washer 36 and at between the clutch plate 22 and the first friction washer 26a.

Therefore, within such a small torsion angle as the allowable sliding angle $\theta$ as shown in FIG. 4, a hysteresis characteristic shown by a first stage characteristic 38 is exerted. A hysteresis torque H1 of the first stage characteristic 38 becomes a hysteresis torque as large as 25 kg.m which is a sum of a hysteresis torque of 2 kg.m generated by the first friction washer 26a and that of 0.5 kg.m generated by 36.

In case for example when a large torsion angle of above the allowable sliding angle $\theta$ is generated at the time of such as engaging and disengaging the clutch, the projection 29a strikes against the end of the hole 25a and the retaining plate 24 slides integrally with the friction plate 28, so that the hysteresis torque is not generated at the second friction washer 36 but generated at both the first friction washers 26a & 26b.

Under this state, a hysteresis torque H2 as large as 4 kg.m is generated, which is a sum of a hysteresis torque of 2 kg.m generated by the first friction washer 26a and that of 2 kg.m generated by the first friction washer 26b.

Consequently, within the range of small torsion angle of below the allowable sliding angle $\theta$ caused by the engine torque fluctuation, a torque fluctuation is absorbed by the hysteresis torque H1 as large as about 60% of the hysteresis torque H2.

Further, the torque from the retaining plate acts on the projection 29a at a torsion angle of above the allowable sliding angle $\theta$. However, since the projection 29a is formed on an outer peripheral part of the friction plate 28 which is positioned at a radius R, a load applied on the projection 29a will be decreased as compared with a conventional case where the projection 29a is provided at an inner peripheral part of the friction plate 28.

Moreover, the first friction washers 26a & 26b and the second friction washer 36 contact with the clutch plate 22, the retaining plate 24, the flange 20b and the sub-friction plate 34 over the entire circumference thereof, so that no deviated wear will occur and a stable hysteresis torque characteristic will be obtainable over a long period.

EMBODIMENT 2

The second embodiment of the first invention will be described hereunder with reference to FIG. 5. Incidentally, in FIG. 5, a part attached with the same symbol as FIG. 1 shows the same as or equivalent to a corresponding part of FIG. 1.

Figure 5:
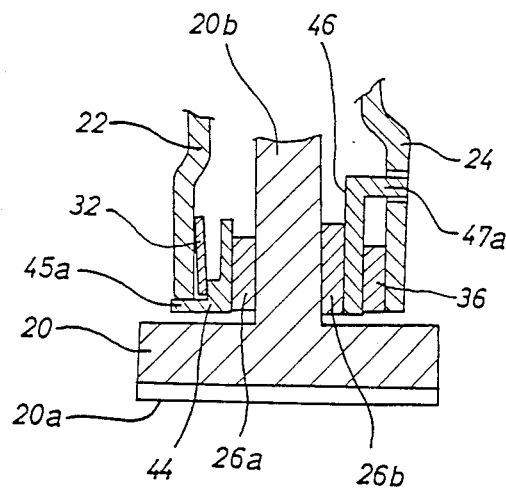
FIG. 5 is a vertical sectional partial view showing a clutch disc of a second embodiment applied with the first invention.

In FIG. 5, the first friction washer 26a, a friction plate 44 and the cone spring 32 are interposed in this sequential order from inside between the flange 20b and the clutch plate 22. Projections 45a are formed on an inner peripheral part of the friction plate 44 at circumferential four places for example, and the projections 45a fit in the clutch plate 22 so as to be permitted sliding integrally therewith.

The first friction washer 26b, the sub-friction plate 46 (intermediate member) and the second friction washer 36 are interposed in this sequential order from inside between the flange 20b and the retaining plate 24, and projections 47a are formed on an outer peripheral part of the sub-friction plate 46 at circumferential four places for example. The projections 47a fit in the retaining plate 24 so as to slide freely at the allowable sliding angle $\theta$ in the same manner as the projection 29a of the first embodiment.

In this second embodiment, the friction plate 44 slides integrally with the clutch plate 22 and the retaining plate 24 but the sub-friction plate 46 does not slide within a small torsion angle of below the allowable sliding angle $\theta$, and the same hysteresis characteristic as the first stage characteristic 38 of FIG. 4 is obtainable. Further, also at a large torsion angle of above the allowable sliding angle $\theta$, the same hysteresis characteristic as the second stage characteristics 40 of FIG. 4 is obtainable.

EMBODIMENT 3

The third embodiment applied with the second invention (claim 4) will be described hereunder with reference to FIG. 6. Incidentally, in FIG. 6, a part attached with the same symbol as FIG. 1 shows the same as or equivalent to a corresponding part of FIG. 1.

Figure 6:
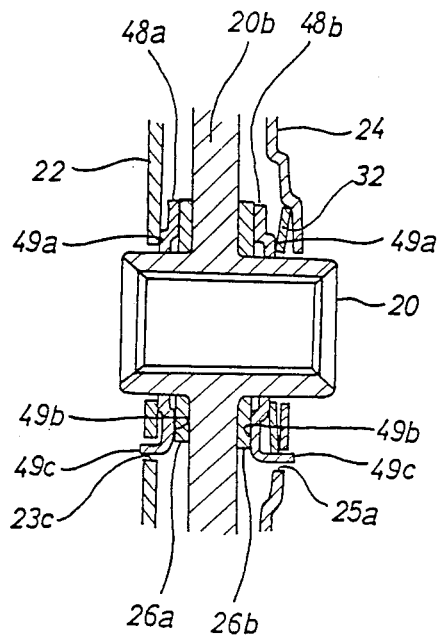
FIG. 6 is a vertical sectional partial view showing a clutch disc of a third embodiment applied with a second invention.
Figure 7:
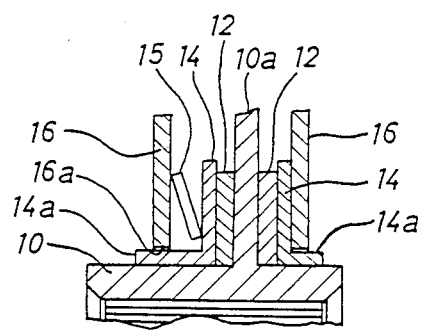
FIG. 7 is a vertical sectional partial view showing a conventional embodiment.

In FIG. 6, the first friction washer 26a and a friction plate 48a (intermediate member) are interposed in this sequential order from inside between the flange 20b and the clutch plate 22. The friction plate 48a is formed, for example, of a friction material and has an approximately annular shape.

A second contact face 49a, which is bent by means of press work, for example, toward the clutch plate 22 to be pressed on an inner face of the clutch plate 22, is formed on an inner peripheral part of the friction plate 48a, and the second contact face 49a is set to a comparatively small area. A first contact face 49b pressing on the first friction washer 26a is formed on a radially external side of the second contact face 49a, and the first contact face 49b is set to a large area, for example, about three times as large as the second contact face 49a. Further, projections 49c are formed at circumferential four places for example, on a radially external side of the first contact face 49b and the projectios 49c fit in holes 23c of the clutch plate 22 so as to be permitted sliding within the allowable sliding angle θ in the same manner as the projection 29a of the first embodiment.

The first friction washer 26b, a friction plate 48b (intermediate member) and the cone spring 32 are interposed in this sequential order from inside between the flange 20b and the retaining plate 24. The friction plate 48b has the same shape and material as the friction plate 48a. Projections 49c of the friction plate 48b fit in holes 25a of the retaining plate 24 so as to be permitted sliding within the allowable sliding angle θ in the same manner as the projection 29a of the first embodiment.

The cone spring 32 presses the friction plate 48b and the first friction washer 26b against the flange 20b, and an inside inner peripheral part of the cone spring 32 presses on the second contact face 49a of the friction plate 48b. The first contact face 49b presses on the first friction washer 26b, too.

In this third embodiment; comparatively small hysteresis torques are generated between the cone spring 32 and the second contact face 49a of the friction plate 48b and between the clutch plate 22 and the second contact face 49a of the friction plate 48a, within a small torsion angle of below the allowable sliding angle θ; and large hysteresis torques are generated between the first contact faces 49b of the both friction plates 48a & 48b and the first friction washers 26a & 26b, at a large torsion torque of above the allowable sliding angle θ.

EFFECT OF THE INVENTION

In the damper disc of the first invention (claim 1) as described above, the first friction washers generating the large hysteresis torque are provided on both sides of the flange of the spline hub having the spline internal tooth, the approximately annular disc-like intermediate member is provided so as to be pressed on the outside of at least one of the both friction washers, a projection projecting toward the side plate is formed on the radially outer peripheral part of the intermediate member, the projection being made fit in the side plate in such a manner that they can slide freely each other within a specified torsion angle, and the second friction washer generating the small hysteresis torque is provided between said intermediate member and the side plate. Therefore, the following effects become obtainable.

The projections 29a and 47a of the friction plate 28 (FIG. 1) and the sub-friction plate 46 (FIG. 5), both being the intermediate member, are formed on their outer peripheral parts so that, when the same torque is transmitted, the radius R can be made larger than a conventional radius to provide a decrease in loads applied on the projections 29a & 47a and an improvement in strengths of the projections 29a & 47a.

The first friction washers 26a & 26b and the second friction washer 36 press on the clutch plate 22, the retaining plate 24 and the cone spring 32 over their entire circumferences; so that the magnitudes of the hysteresis torques H1 & H2 become stable and there is no possibility of occurence of the deviated wear even after a long period of use.

Then, in the damper disc of the second invention, the approximately annular disc-like intermediate member made of the friction material is provided, the projection projecting toward the side plate is formed on the radially outer peripheral part of the intermediate member, the projection being made fit in the side plate in such a manner that they can slide freely of each other within the specified torsion angle, the first contact face having the large area is formed on the face at the first friction washer side of said intermediate member, and the second contact face having the small area is formed on the face at the side plate side of said intermediate member. Therefore, the following effects become obtainable in addition to those of the first invention.

First, the magnitudes of the hysteresis torques H1 & H2 are determined by the difference between the area of the second contact face 49a and the area of the first contact face 49b of between the friction plates 48a and the friction plate 48b, so that the magnitude of the hysteresis torques H1 & H2 can be set exactly.

Moreover, since components interposed between the flange 20b and the clutch plate 22 & the retaining plate 24 are only the first friction washer 26a & 26b, the friction plates 48a & 48b and the cone spring 32; a quantity of component becomes small to provide a simple construction as compared with the conventional embodiment and the first & second embodiments.

OTHER EMBODIMENT (1) The present invention is applicable not only to the clutch disc as described in the above embodiments but to a damper disc for an automatic transmission.

What is claimed is:

1. A damper disc, in which first friction washers having a relatively large friction coefficient for generating a large hysteresis torque are provided on opposite sides of a flange of a spline hub having a spline internal tooth, an approximately annular disc-like intermediate member is provided so as to be pressed on an outside of at least one of said first friction washers, a projection projecting toward a side plate is fored on a radially outer peripheral part of said intermediate member, said projection extending into an opening in said side plate, said opening having a length in the circumferential direction not substantially less than 2° and not substantially more than 3° longer than the length of said projection in the circumferential direction so that said intermediate member and said side plate can slide freely with respect to each other within the angle of said circumferential direction length difference, and a second friction washer having a relatively small hysteresis torque is provided between said intermediate member and said side plate whereby, when said intermediated member and said side plate slide with respect to each other within said circumferential length difference, said at least one of said friction washers and said second friction washer generate a relatively small hysteresis torque and, when said intermediate member and said side plate slide together beyond said circumferential length difference, said first friction washers generate a relatively large hysteresis torque.

2. A damper disc as set forth in claim 1, in which a sub-friction washer having a small friction coefficient is disposed between said intermediate member and said second friction washer, the sub-friction washer is made fit with the projection of the intermediate member so as to made rotate integrally with the intermediate member, and a cone spring is compressively installed between the sub-friction washer and the intermediate member so that the cone spring presses the sub-friction washer and the second friction washer against the side plate side.

3. A damper disc as set forth in claim 1, in which a friction plate and a cone spring are provided in this sequential order from the first friction washer side between the remaining first friction washer at the side equipping no second friction washer and the side plate, projection projecting toward the side plate side is provided on an inner peripheral end of said friction plate, and said projection mates with said side plate.

* * * * *

UNITED STATES PATENT AND TRADEMARK OFFICE
CERTIFICATE OF CORRECTION

PATENT NO. : 4,848,552

DATED : July 18, 1989

INVENTOR(S) : NISHIMURA et al

It is certified that error appears in the above-identified patent and that said Letters Patent is hereby corrected as shown below:

On the cover page, Item [73], "Seisakucho," should read
--Seisakusho,--.

Signed and Sealed this

Sixteenth Day of October, 1990

Attest:

HARRY F. MANBECK, JR.

*Attesting Officer*      *Commissioner of Patents and Trademarks*